Dec. 10, 1946.   J. G. LEE   2,412,460
BOMB DISPLACING GEAR
Filed Dec. 17, 1935   3 Sheets-Sheet 1
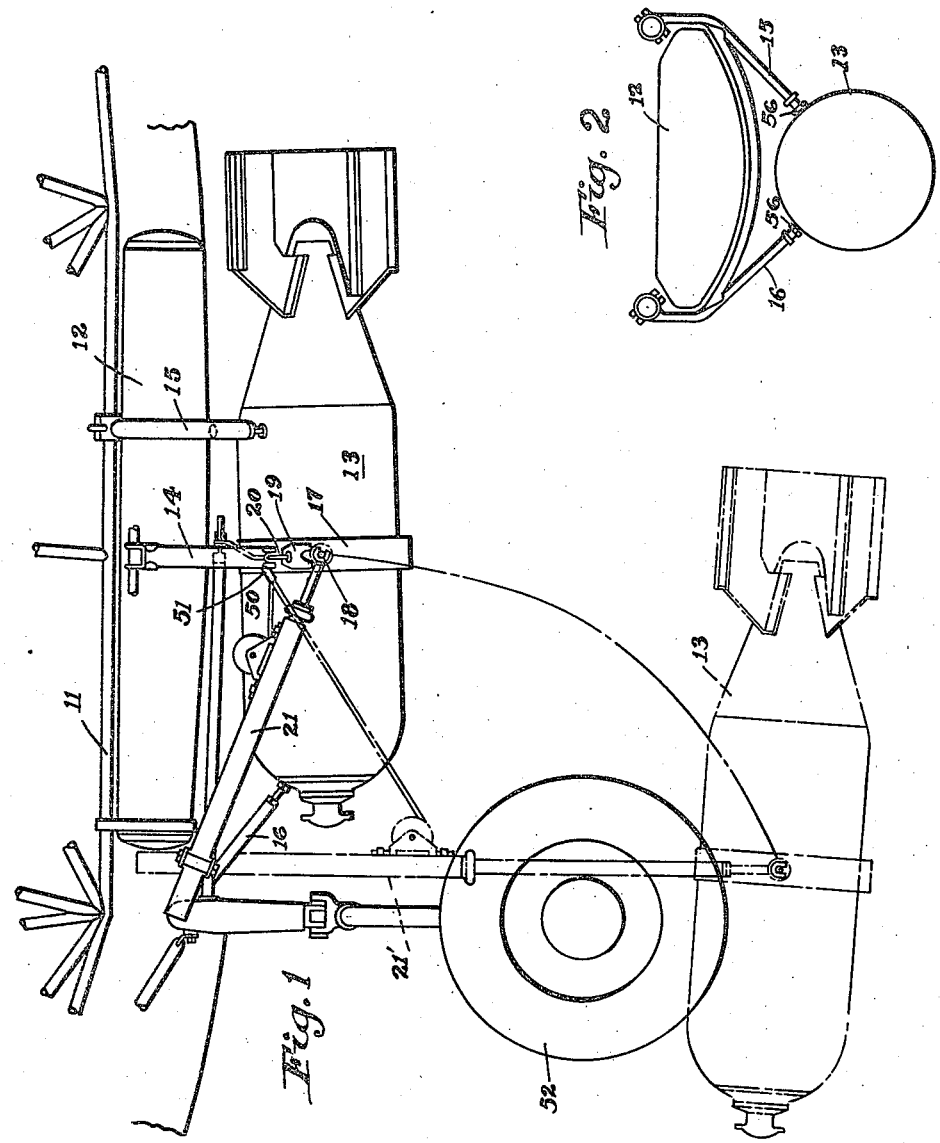
Inventor:
John G. Lee
by John J. Fitzgerald
Attorney Dec. 10, 1946. J. G. LEE 2,412,460
BOMB DISPLACING GEAR
Filed Dec. 17, 1935 3 Sheets-Sheet 2
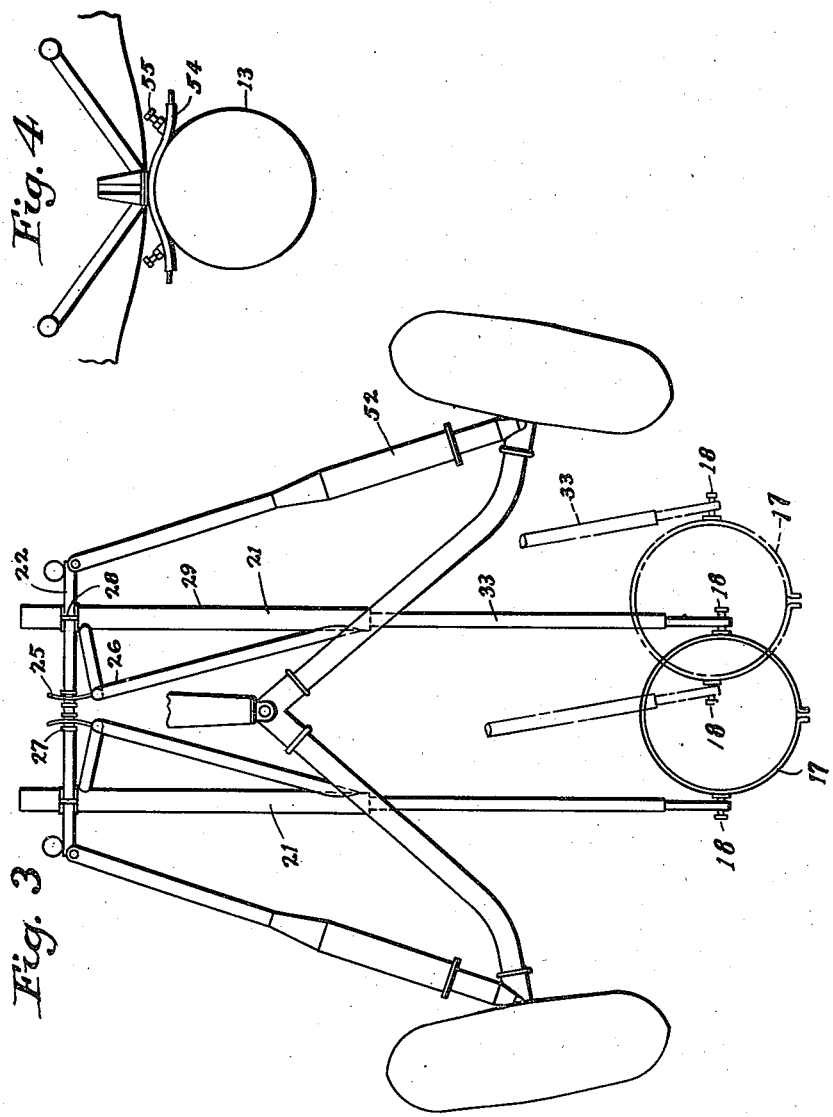
Inventor:
John G. Lee
by John J. Fitzgerald
Attorney

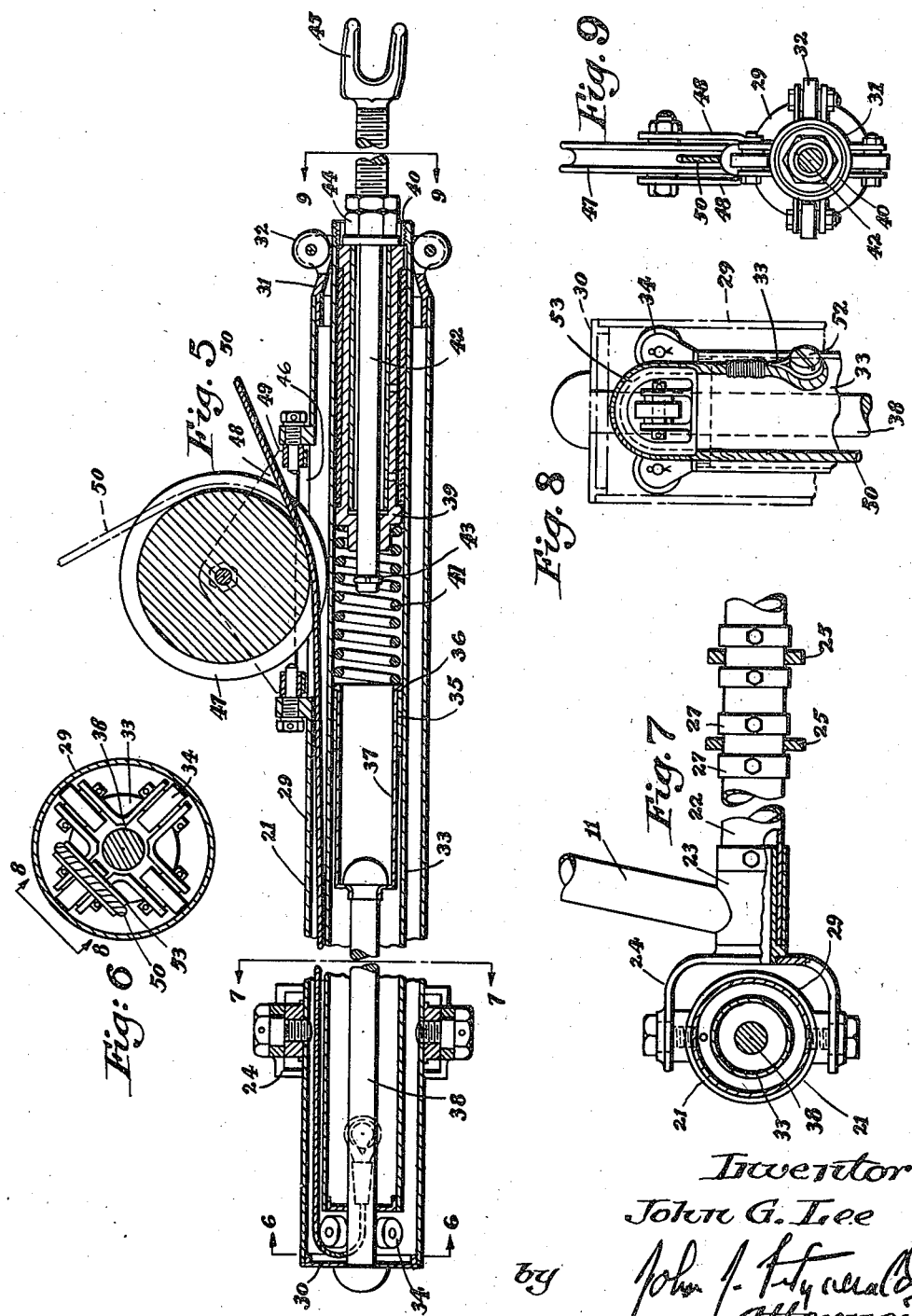

Patented Dec. 10, 1946

2,412,460

UNITED STATES PATENT OFFICE 2,412,460

BOMB DISPLACING GEAR

John G. Lee, Farmington, Conn.

Application December 17, 1935, Serial No. 54,901

8 Claims. (Cl. 89—1.5)

1

This invention relates to means for displacing bombs when they are released from securement in a bomb rack carried by an aircraft to prevent fouling of the landing gear or propeller by such bombs.

This invention has among its several objects to provide a gear that will swing a bomb, when it is released during a dive, to such a distance from the craft that it will always clear the landing gear and propeller; to provide mechanism operable by movement of an arm of the gear to project a telescoping member of the arm and thereby increase the effective length of the arm; and to utilize a portion of the mechanism for projecting the said member to return the arm to its initial position adjacent the body of the craft.

In the drawings;

Fig. 1 is a side elevational view of a portion of an aircraft equipped with my novel displacing gear;

Fig. 2 is a detailed view of a bracing means for steadying the bomb during flight;

Fig. 3 is a front elevational view showing the relative positions of the landing gear of the aircraft and the bomb at the instant of release of the bomb from the gear;

Fig. 4 is a detailed view of a second type of bomb steadying bracing means;

Fig. 5 is a longitudinal sectional view of one of the arms of the gear;

Fig. 6 is a transverse section taken on the line 6—6, Fig. 5;

Fig. 7 is a view taken transversely of the arm on the line 7—7, Fig. 5;

Fig. 8 is a side elevational view of the mechanism inside the arm, looking from the position indicated by the line 8—8, Fig. 6;

Fig. 9 is taken on the line 9—9, Fig. 5, looking in the direction of the arrows.

It has been found that launching bombs from an aircraft while diving steeply at extremely high speeds has many advantages over dropping the bombs from an aircraft in horizontal flight, in that the bombing plane makes a much more difficult target for enemy gunners, the bombs may be dropped at lower altitudes and thereby the effect of cross winds be much diminished and the path of the aircraft itself directs the bomb and renders unnecessary costly and not always accurate sighting instruments.

However, there is danger that a bomb, dropped while in a steep dive, may foul and seriously damage the landing gear and propeller of the bombing craft, unless the bomb is moved away from the body of the plane a sufficient distance to clear the parts above mentioned. When the bomb is so displaced the longitudinal axis thereof must be maintained parallel to the longitudinal axis of the bombing craft, otherwise the subsequent path of the bomb is uncertain and hits are largely a matter of chance. The present invention is designed to meet the above mentioned requirements for safety and accuracy in dive bombing.

In Fig. 1 a portion of the aircraft structure is designated by the numeral 11 and the belly fuel tank by 12. The bomb 13 is carried in any suitable type of bombing rack 14 and is steadied by braces 15 and 16. The band 17 is clamped about the bomb in such position that the oppositely disposed trunnions 18 on the band 17 lie on a line passing through the center of gravity of the bomb 13. Apertured ears 19 are fixed on band 17 and are engaged by hooks 20 of the bomb rack 14; the detail structure of this type of bomb rack is the subject matter of my co-pending application Serial No. 54,902, filed December 17, 1935.

The displacing gear comprises two arms designated in their entirety by the numeral 21. The arms are identical in structure and differ only in that they are right and left hand, respectively, and are pivotally mounted on the aircraft structure a short distance rearwardly of the landing gear to have a principal swinging movement longitudinally of the aircraft, but they are also free to execute a limited movement transversely to their direction of principal swing. As shown in Figs. 1 and 7, the transverse member 22 is rotatable in a sleeve bearing 23 fixed to the aircraft structure 11 and is provided with a fork bracket 24 in which the arm 21 is pivotally mounted to swing transversely of the craft. The lateral swing of the arm is limited by member 25 having in it an elongated slot through which the member 22 passes and which is mounted upon a supporting member 26 fixed to the arm 21. Sliding of the member 25 lengthwise of the member 22 is restricted by a collar 27 which is fixed to the member 22 and so spaced that the member 25 may move freely transversely of the member 22 through a distance equal to the length of the slot in the member 25 but is restrained against shifting longitudinally on the member 22. In Fig. 3, the arms 21 are secured on the transverse member 22 by U bolts 28 which permit free swinging of the arms 21.

Each arm 21 is made up of an outer tubular member 29 having a closure 30 in the end thereof nearest the pivotal support and a member 31 carrying rotatable rollers 32 fixed to the other end thereof. Inside the member 29 is slidably mounted a second tubular member 33 which contacts the rollers 32 and has mounted on its inner end anti-friction rollers 34 that bear against the inner surface of the member 29 and is thus mounted for movement in the member 29 with a minimum of frictional resistance. At a suitable distance from the inner end of member 33 a stop 35 is secured in the member 33 and is engaged by flange 36 on a connecting sleeve 37 to which one end of the resilient extensible cord 38 is attached, the other end of the cord 38 being fixed to the closure 30. It is thus apparent that the member 38 will be elongated by movement of the inner tubular member 33 outwardly from the member 29 and will retract the member 33 into the member 29 as soon as the force moving the member 33 outwardly ceases to act.

A guide bushing 39 is retained in the outer end of tubular member 33 by an externally threaded nut 40 screwed into the member 33 and is normally held in position against the nut 40 by spring 41 which bears against the flange 36 and also against the bushing 39. A shank 42 is slidable in the bushing 39 but the extent of its sliding movement therein is limited by a ring 43 upon the inner end of the shank and by a nut 44 threaded on the shank externally of the bushing 39. The outer end of the shank 42 is bifurcated, as indicated at 45, to engage the trunnions 18 carried by the band 17 around the bomb.

A slot 46 is formed in the side wall of member 29 and a sheave 47 is mounted in brackets 48 with the edge of the sheave extending into the slot 46. The brackets 48 are pivoted on the pins 49 to permit of some degree of angular adjustment of the axis of the sheave in response to lateral movement of the arm. A cable 50 is attached at one end to the bomb rack at the point 51, passes over sheave 48 through slot 46 and is attached at its other end to the inner tubular member 33 at the point 52. The stress on the fastening means at 52 is diminished and the tendency to bind member 33 against member 29 is lessened by passing the cable 50 over a grooved arcuate member 53 before attaching to the member 33.

When the fork 45 is engaged with the trunnion 18 on the bomb, the spring 41 is somewhat compressed which insures that the fork will remain in firm contact with the trunnion. Upon release of the bomb from the rack 14 the weight of the bomb tends to move the bomb vertically downwardly, but since the aircraft is at that time in a steep dive the greater portion of the gravitational pull on the bomb will be exerted along a component parallel to the arms 21 and so will maintain the trunnions 18 engaged in the forks 45 until the arms have reached the dotted line position 21' shown in Fig. 1. As the arms execute this swing the length of that portion of cable 50 between sheave 47 and the point 51 is increased which projects the inner member 33 and the parts carried thereby outwardly from the member 29, and thus the length of the arms is increased sufficiently to swing the bomb beyond the landing gear 52 and the propeller 53. The relation of cable 50 to sheave 47 when the arm is swung down is shown in dotted lines in Fig. 5. The movement of the bomb includes a large component substantially at right angles to the fore-and-aft axis of the aircraft and therefore when the arm has reached the position 21' that component is acting parallel to the limbs of the fork 45 and slips the trunnions 18 free of the fork 45. Inasmuch as the trunnions 18 are on a line passing through the center of gravity of the bomb, the axis of the bomb remains parallel to its original position throughout the displacing movement and the aim thereof is not disturbed.

When the member 33 is projected as above described, the resilient member 38 is put under a heavy tensional strain, and therefore as soon as the bomb is freed from the forks 45 the member 33 is retracted into member 29 which requires a lengthening of the distance between the inner end of member 33 and the sheave 47, thus exerting upon sheave 47, through cable 50, a force that swings the arm 21 up to the body of the aircraft.

Fig. 2 shows in detail the structure of the brace 15 which is provided with adjustable bolts 56 that bear upon the bomb on opposite sides of a vertical plane through the axis of the bomb and prevents swinging of the bomb about an axis perpendicular to the bomb axis both vertically and horizontally. In Fig. 4, a modified form of brace is shown wherein the curved strap 54 carries the bolts 55 that may be screwed down into contact with the bomb to steady it during flight.

I claim:

1. The combination with means for detachably supporting from an aircraft a bomb provided with trunnions oppositely disposed on a line through the center of gravity of the bomb, of a pair of telescoping arms, pivotal mounting means secured to each arm adjacent an end thereof and to said craft forwardly of said supporting means, said mountings permitting said arms to swing longitudinally of the craft and also transversely thereof to a limited degree, each of said arms comprising an outer tubular member having a slot in it, a sheave mounted with its edge disposed in said slot, guide wheels mounted on that end of said member remote from said mounting, a second tubular member slidably mounted in the first said member in guiding contact with said guide wheels, guide wheels mounted on the inner end of said second tubular member to contact said first member, a stop in said second member substantially midway between the ends of said second member, a sleeve having a flange engaging said stop, an elastic cord connecting said sleeve and the end of said first member adjacent the mounting of said first member, a bushing slidable in the outer end of said second tubular member, means to prevent separation of said bushing from said second member, a shank mounted in said bushing for limited sliding movement, said shank having at its outer end a bifurcation engageable with a trunnion on said bomb, a spring between said sleeve and said bushing to retain said bifurcation in engagement with said trunnion, and a cable passing over said sheave and having its ends respectively attached to said aircraft and to said second tubular member.

2. The combination with means for detachably supporting from an aircraft a bomb provided with trunnions oppositely disposed on a line through the center of gravity of the bomb, of a pair of telescoping arms, pivotal mounting means secured to each arm adjacent an end thereof and to said craft forwardly of said supporting means, said mountings permitting said arms to swing longitudinally of the craft and also transversely thereof to a limited degree, each of said arms comprising an outer tubular member having a slot in it, a sheave mounted with its edge disposed in said slot, a second tubular member slidably mounted in said outer tubular member, extensible resilient means operatively connecting said outer tubular member and said second tubular member and tending normally to retract said second member in said outer member, a terminally bifurcated member carried by said second tubular member to engage a trunnion on a bomb, and a flexible member passing over said sheave and having its ends respectively connected to said second tubular member and to said aircraft.

3. The combination with means for detachably supporting from an aircraft a bomb provided with trunnions oppositely disposed on a line through the center of gravity of the bomb, of a pair of telescoping arms, pivotal mounting means secured to each arm adjacent an end thereof and to said craft forwardly of said supporting means, said mountings permitting said arms to swing longitudinally of the craft and also transversely thereof to a limited degree, each of said arms comprising an outer tubular member, a second tubular member slidably mounted in said outer tubular member, a terminally bifurcated member carried by said second tubular member to engage a trunnion on a bomb, resilient means operatively connecting said outer tubular member and said second tubular member and tending normally to retract said second member in said outer member, and means operatively connecting each arm to said aircraft to cooperate with said resilient means to retract said arms upon release of a bomb engaged therewith when said arms have been swung down by the weight of the bomb.

4. Bomb releasing gear, comprising a pair of arms mounted on an aircraft to swing fore-and-aft of such craft, each of said arms comprising two telescoping members, a terminally bifurcated element carried by one of said members to engage a trunnion on a bomb, a flexible member attached to said one member and to said aircraft to project said one member when the arm is swung away from the aircraft, and an extensible resilient member connecting said two telescoping members to be placed under tension when said one member is projected and thereafter by its contraction to draw the arm back into position adjacent the aircraft.

5. Bomb releasing gear, comprising a pair of arms, each of said arms including an outer telescoping member swingably mounted on an aircraft, an inner telescoping member slidable therein, guide wheels on said outer member at one end bearing against said inner member, guide wheels on the opposite end of said inner member bearing against said outer member, a bifurcated member carried by said inner member and extending beyond said outer member to engage a trunnion on a bomb, means to project said inner member when said arm is swung away from the aircraft, and means simultaneously to retract said inner member and to return said arm toward the aircraft when the bomb is freed from said bifurcated member.

6. Bomb releasing gear, comprising a pair of arms, each of said arms including an outer telescoping member swingably mounted on an aircraft, an inner telescoping member slidable therein, guide wheels on said outer member at one end bearing against said inner member, guide wheels on the opposite end of said inner member bearing against said outer member, a bifurcated member carried by said inner member and extending beyond said outer member to engage a trunnion on a bomb, means to project said inner member when said arm is swung away from the aircraft, and means energized by the projection of said inner member simultaneously to retract said inner member and to return said arm toward the aircraft when the bomb is freed from said bifurcated member.

7. Bomb releasing gear, comprising a pair of arms, each of said arms including an outer telescoping member swingably mounted on an aircraft, an inner telescoping member slidable therein, guide means for said inner member carried at one end of said outer member, guide means on the opposite end of said inner contacting said outer member, a bifurcated member carried by said inner member and extending beyond said outer member to engage a trunnion on a bomb, means to project said inner member when said arm is swung away from the aircraft, and means simultaneously to retract said inner member and to return said arm toward the aircraft when the bomb is freed from the bifurcated member.

8. Bomb releasing gear, comprising a pair of extensible arms swingably mounted upon an aircraft, a bifurcated terminal member carried by each of said arms operatively to engage a bomb, and a spring in each arm to press said bifurcated member resiliently into engagement with the coacting element on the bomb, and means to extend said arms when swung away from the aircraft.

JOHN G. LEE.